US011496597B2

(12) United States Patent
Asati et al.

(10) Patent No.: US 11,496,597 B2
(45) Date of Patent: *Nov. 8, 2022

(54) METHODS AND APPARATUSES FOR CONTENT DELIVERY OVER MOBILE NETWORKS WITH MULTI-ACCESS EDGE COMPUTING (MEC) CONTROL AND USER PLANE SEPARATION (CUPS)

(71) Applicant: Cisco Technology, Inc., San Jose, CA (US)

(72) Inventors: Rajiv Asati, Morrisville, NC (US); Humberto Jose La Roche, Ocean, NJ (US); Eric C. Friedrich, North Easton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,298

(22) Filed: Jun. 4, 2021

(65) Prior Publication Data
US 2021/0352157 A1    Nov. 11, 2021

Related U.S. Application Data

(63) Continuation of application No. 16/184,220, filed on Nov. 8, 2018, now Pat. No. 11,038,979.

(51) Int. Cl.
*H04L 67/568*     (2022.01)
*H04L 67/02*      (2022.01)
(Continued)

(52) U.S. Cl.
CPC ........ *H04L 67/568* (2022.05); *H04L 61/4511* (2022.05); *H04L 65/61* (2022.05); *H04L 65/75* (2022.05); *H04L 67/02* (2013.01)

(58) Field of Classification Search
CPC ..... H04L 61/4511; H04L 65/61; H04L 65/75; H04L 67/02; H04L 67/568
(Continued)

(56) References Cited

U.S. PATENT DOCUMENTS 6,836,667 B1    12/2004 Smith, Jr.
7,461,147 B1    12/2008 Mowat et al.
(Continued)

OTHER PUBLICATIONS

Chang GE et al., "Toward QoE-Assured 4k Video-on-Demand Delivery Through Mobile Edge Virtualization With Adpative Prefetching", IEEE Transactions on Multimedia, vol. 19, No. 10, Oct. 2017, pp. 1-16.
(Continued)

*Primary Examiner* — Wing F Chan
*Assistant Examiner* — Leon Y Tseng

(57) ABSTRACT

A method is performed at a mobile core, including assigning a first cache servicing a client device in response to a first request for a media content item based at least in part on a first IP address of the client device associated with a first edge location. The method further includes providing a first portion of the media content item from the first cache. The method additionally includes triggering a plurality of caches at edge locations proximate to the first edge location to retrieve a second portion of the media content item. The method also includes receiving a continuation request from the client device with a second IP address associated with a second edge location. The method further includes selecting a second cache from the plurality of caches based at least in part on the second IP address and continuing providing the media content item from the second cache.

17 Claims, 6 Drawing Sheets

(51) Int. Cl.
*H04L 61/4511* (2022.01)
*H04L 65/61* (2022.01)
*H04L 65/75* (2022.01)

(58) Field of Classification Search
USPC .................................................... 709/213
See application file for complete search history.

(56) References Cited

U.S. PATENT DOCUMENTS

| | | | |
|---|---|---|---|
| 8,320,916 | B2 | 11/2012 | Cortes et al. |
| 9,743,322 | B2 | 8/2017 | Lee et al. |
| 10,027,527 | B2 | 7/2018 | Mas Ivars et al. |
| 2011/0171952 | A1 | 7/2011 | Niu |
| 2014/0245359 | A1 | 8/2014 | De Foy et al. |
| 2015/0024753 | A1 | 1/2015 | Palenius et al. |
| 2015/0063249 | A1 | 3/2015 | Jover Segura et al. |
| 2017/0026882 | A1 | 1/2017 | Centoza et al. |
| 2017/0086131 | A1 | 3/2017 | Gupta |
| 2017/0188054 | A1 | 6/2017 | Ma et al. |
| 2018/0097908 | A1 | 4/2018 | Ayyagar et al. |
| 2019/0199817 | A1 | 6/2019 | Smith et al. |
| 2019/0349446 | A1 | 11/2019 | Lawrence et al. |

OTHER PUBLICATIONS

Foivos Michelinakis, "Pratical Challenges of Network Optimized Stored Video Delivery", eprints networks.indea.org, Page Accessed on Aug. 14, 2018, pp. 1-16.

Yuyi Mao et al., "A Survey on Mobile Edge Computing: The Communication Perspective", IEEE Communications Surveys & Tutorials, vol. 19, No. 4, Fourth Quarter 2017, Aug. 25, 2017, 37 pages.

Shuo Wang et al., "A Survey on Mobile Edge Networks: Convergence of Computing, Caching and Communications", Jun. 7, 2017, 23 pages.

3GPP Organizational Partners, "3rd Generation Partnership Project; Technical Specification Group Services and System Aspects; Architecture enhancements for control and user plane separation of EPC nodes; Stage 2 (Release 14)", 3GPP TS 23.214 V14.8.0, Sep. 2018, 92 pages.

3GPP Organizational Partners, "3rd Generation Partnership Project; Technical Specification Group Services and System Aspects; System Architecture for the 5G System; Stage 2 (Release 15)", 3GPP TS 23.501 V15.3.0, Sep. 2018, 226 pages.

R. Hamilton et al., "QUIC: A UDP-Based Secure and Reliable Transport for HTTP/2", draft-tsvwg-quic-protocol-02, Network Working Group, Internet-Draft, Intended status: Informational, Jan. 13, 2016, 37 pages.

Xiaoke Jiang et al., "nCDN: CDN Enhanced with NDN", 2014 IEEE Infocom Workshops: 2014 IEEE INFOCOM Workshop on Name-Oriented Mobility, https://www.researchgate.net/publication/271481661_nCDN_CDN_enhanced_with_NDN, Apr. 2014, 6 pages.

Greg White et al., "Content Delivery With Content-Centric Networking", Cable Television Laboratories, Inc., Feb. 2016, 26 pages.

Diego Perino et al., "A Reality Check for Content Centric Networking", ICN'11, Aug. 19, 2011, 6 pages.

Niels Laukens, "Adaptive Streaming", EBU Technical Review—2011 Q1, Feb. 4, 2011, 6 pages.

Thomas Stockhammer, "Dynamic adaptive streaming over HTTP—standards and design principles", MMSys '11 Proceedings of the second annual ACM conference on Multimedia systems, Feb. 23-25, 2011, 2 pAGES.

Kevin J. Ma et al., "Mobile Video Delivery with HTTP", IEEE Communications Magazine, Apr. 2011, 10 pages.

Michael Seufert et al., "A Survey on Quality of Experience of HTTP Adaptive Streaming", IEEE Communication Surveys & Tutorials, vol. 17, No. 1, First Quarter 2015, Sep. 30, 2014, 24 pages.

Ali C. Begen et al., "Watching Video over the Web", Part 1: Streaming Protocols,Mar./Apr. 2011, 10 pages.

Ali C. Begen et al., "Watching Video over the Web", Part 2: Applications, Standardization, and Open Issues, May/Jun. 2011, 5 pages.

Checko, Aleksandra et al., "Cloud RAN for Mobile Networks—a Technology Overview", https://doi.org/10.1109/COMST.2014.2355255, May 8, 2019, 25 pages.

Fabio Giust et al., "MEC Deployments in 4G and Evolution Towards 5G", ISBN No. 979-10-92620-18-4, Feb. 2018, 24 pages.

Sue Marek, "Google Uses vEPC to Deliver WiFi to Train Stations in India", Apr. 21, 2016, 5 pages.

International Search Report and Written Opinion in counterpart International Application No. PCT/US2019/059326, dated Feb. 7, 2020, 14 pages.

J. Seedorf et al., "Application-Layer Traffic Optimization (ALTO) Problem Statement", Network Working Group, Oct. 2009, 14 pages.

Xiaoqi Yin et al., "A Control-Theoretic Approach for Dynamic Adaptive Video Streaming over HTTP", Association for Computing Machinery, SIGCOMM '15, Aug. 17-21, 2015, 14 pages.

Tuyen X. Tran et al., "Collaborative Mobile Edge Computing in 5G Networks: New Paradigms, Scenarios, and Challenges", IEEE Communications Magazine, Apr. 2017, 8 pages.

Yi Sun et al., "CS2P: Improving Video Bitrate Selection and Adaptation with Data-Driven Throughput Prediction", Association for Computing Machinery, SIGCOMM '16, Aug. 22-26, 2016, 14 pages.

Shankaranarayanan Puzhavakath Narayanan et al., "Reducing Latency Through Page-aware Management of Web Objects by Content Delivery Networks", Association for Computing Machinery, SIGMETRICS '16, Jun. 14-18, 2016, 12 pages.

Hasti A. Pedersen et al., "Enhancing Mobile Video Capacity and Quality Using Rate Adaptation, RAN Caching and Processing", IEEE/ACM Transactions On Networking, vol. 24, No. 2, Apr. 2016, 15 pages.

Ravi Netravali et al., "Mahimahi: Accurate Record-and-Replay for HTTP", 2015 USENIX Annual Technical Conference (USENIC ATC '15), Jul. 8-10, 2015, ISBN 978-1-931971-225, 14 pages.

Joseph Medley, "Exceeding the buffering quota", Google Developers, last updated Jan. 14, 2019, 6 pages.

Jongzi Mao et al., "Neural Adaptive Video Streaming with Pensieve", Association for Computing Machinery, SIGCOMM '17, Aug. 21-25, 2017, 14 pages.

Danny H. Lee et al., "Caching in HTTP Adaptive Streaming: Friend or Foe?", Association for Computing Machinery, NOSSDAV '14, Mar. 19-21, 2014, 5 pages.

Zahaib Akhtar et al., "Oboe: Auto-tuning Video ABR Algorithms to Network Conditions", Association for Computing Machinery, SIGCOMM '18, Aug. 20-25, 2018, 15 pages.

3GPP, SA WG2 Meeting #S2-126, S2-182978, "PGW Initiated Low Latency PDN Connectivity Mobility", Cisco Systems, Vodafone, Verizon, NEC, Feb. 26-Mar. 2, 2018, 5 pages.

Xi Liu et al., "A Case for a Coordinated Internet Video Control Plane", Association for Computing Machinery, SIGCOMM'12, Aug. 13-17, 2012, 12 pages.

Chang Ge et al., "QoE-Driven DASH Video Caching and Adaptation at 5G Mobile Edge", Association for Computing Machinery, ICN'16, Sep. 26-28, 2016.

Aditya Ganjam et al., "C3: Internet-Scale Control Plane for Video Quality Optimization", Proceedings of the 12th USENIX Symposium on Networked Systems Design and Implementation (NSDI '15), May 4-6, 2015, ISBN 978-1-931971-218, 15 pages.

Junchen Jiang et al., "Improving Fairness, Efficiency, and Stability in HTTP-Based Adaptive Video Streaming With Festive", IEEE/ACM Transactions On Networking, vol. 22, No. 1, Feb. 2014, 15 pages.

Anawat Chankhunthod et al., "A Hierarchical Internet Object Cache", USENIX Annual Technical Conference, Jan. 1996, 11 pages.

Yun Chao Hu et al., "Mobile Edge Computing A key technology towards 5G", ETSI White Paper No. 11, First edition—Sep. 2015, ISBN No. 979-10-92620-08-5, 16 pages.

Divyashri Bhat et al., "Network Assisted Content Distribution for Adaptive Bitrate Video Streaming", ACM Multimedia Systems Conference MMSys, Jun. 2017, 13 pages.

(56) References Cited

OTHER PUBLICATIONS

Ge Ma et al., "Understanding Performance of Edge Content Caching for Mobile Video Streaming", IEEE Journal On Selected Areas in Communications, vol. 35, No. 5, May 2017, 14 pages.
Hasti Ahlehagh et al., "Video-Aware Scheduling and Caching in the Radio Access Network", IEEE/ACM Transactions On Networking, vol. 22, No. 5, Oct. 2014, 19 pages.

METHODS AND APPARATUSES FOR CONTENT DELIVERY OVER MOBILE NETWORKS WITH MULTI-ACCESS EDGE COMPUTING (MEC) CONTROL AND USER PLANE SEPARATION (CUPS)

CROSS-REFERENCE TO RELATED APPLICATIONS

This application is a continuation of and claims the benefit of priority to U.S. patent application Ser. No. 16/184,220, filed Nov. 8, 2018, the entirety of which is incorporated herein by reference.

TECHNICAL FIELD

The present disclosure relates generally to mobile networks, and more particularly, to methods and apparatuses for content delivery over mobile networks with multi-access edge computing (MEC) control and user plane separation (CUPS).

BACKGROUND

In mobility networks, client devices typically retrieve content from edge caches at content distribution networks (CDNs). When a client device moves (e.g., being carried by a user from one location to another), the client device may switch among different networks (wireless LANs, 5G, etc.), and each is likely to assign a new IP address to the client device. Previously existing systems and methods often direct a client device to seek content from different CDN edge locations in order to reduce content delivery latency, e.g., assigning an edge cache at a location proximate to the client device. Consequently, as the client device moves, the client device is likely to be reassigned to different edge caches, each of which has a respective IP address. These IP address changes often disrupt service continuity and impair Quality of Experience (QoE). For example, the client device IP address changes often break TCP or QUIC streaming sessions. In another example, a newly assigned CDN edge cache according to previously existing methods may not have the portion of media content item that the client device is expecting to continue the streaming session.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
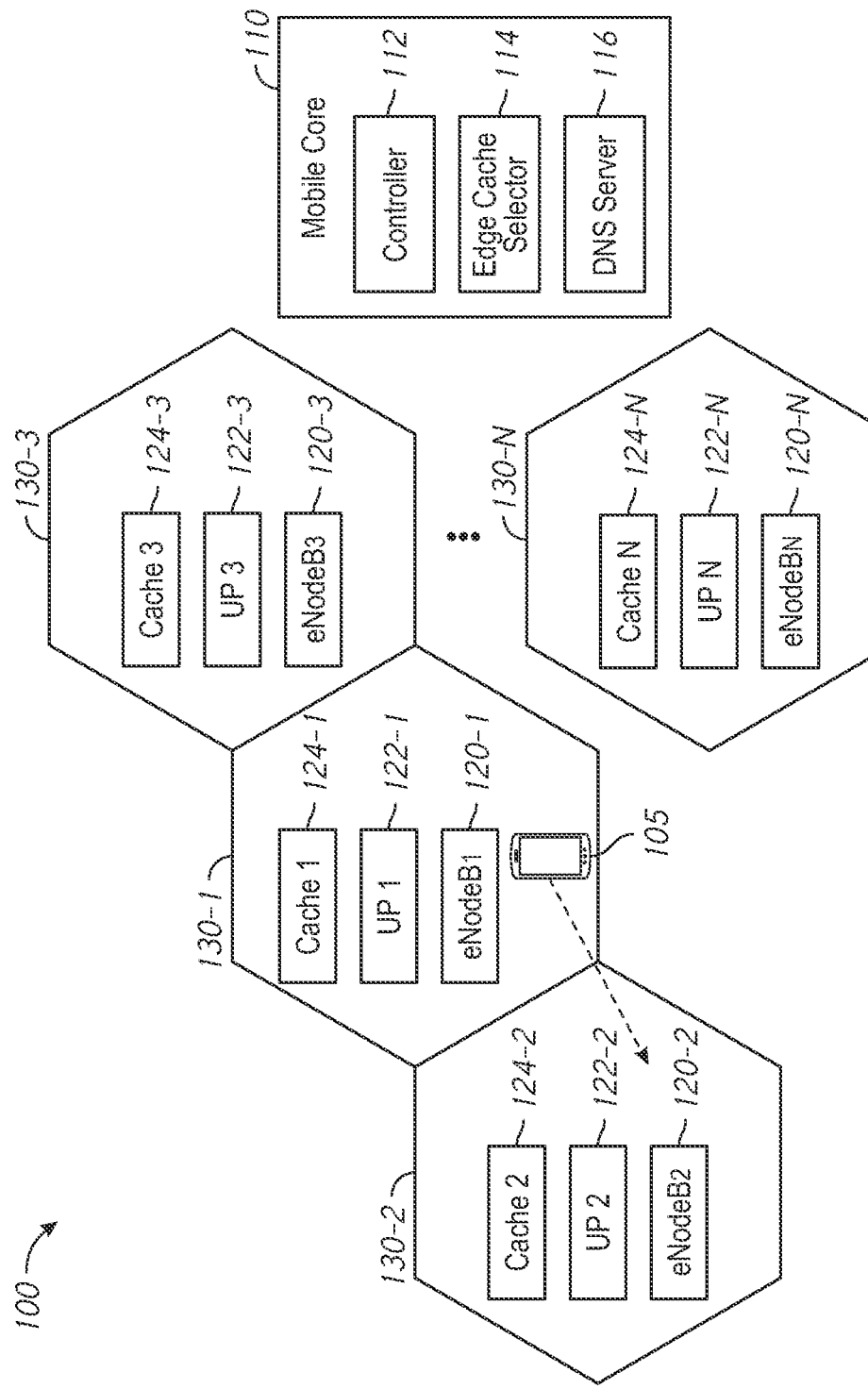
FIG. 1 is an illustration of an example of a 5G network with multi-access edge computing (MEC) control and user plane separation (CUPS) for content delivery in accordance with some implementations.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Disclosed herein are methods and systems for content delivery over mobile networks with multi-access edge computing (MEC) control and user plane separation (CUPS). The methods and systems described herein address the aforementioned session and service continuity issues at the application layer (e.g., compatible with HTTP and HTTP/2 methods over TCP or QUIC). In some implementations, a client device keeps a local playout buffer and keeps state information of a media content item, so that it knows which portion(s) of the media content item to download next. When the client device moves, a handover is executed and a new IP address of the client device is assigned. Further, while playing the media content item from its local playout buffer, the client device attempts to establish a connection to a new edge cache. In some implementations, a DNS server contacted by the client device performs a DNS query and assigns a new edge cache based on the new IP address of the client device. As such, the new edge cache is geographically appropriate. In some implementations, a portion of the media content item is pre-populated on a number of targeted edge caches to ensure Quality of Experience (QoE). The client device can request continued downloading of the media content item from the new edge cache based on the state information it maintains. The result is a seamless video streaming experience, even though the client device has changed its IP address and the content is delivered from a different IP address corresponding to a different edge cache.

Example Embodiments

Referring to FIG. 1, an illustration of an example of a 5G network 100 with multi-access edge computing (MEC) control and user plane separation (CUPS) for content delivery in accordance with some implementations. In 5G, network functions typically are separated into control plane (CP) network functions and user plane (UP) network functions. In general, the user plane network functions carry user traffic, while the control plane network functions carry network signaling. MEC CUPS deployments are intended to reduce latency to the end-user device through proximity. In an MEC CUPS deployment based on 5G mobile core architecture, the user plane is located at edge location, while the control plane is located at the mobile core.

As a non-limiting example, the 5G network with MEC CUPS 100 includes control plane network functions at a mobile core 110 and user plane network functions 122 at a plurality of edge locations 130, e.g., the first user plane (UP 1) 122-1 at the first edge location 130-1, the second user plane (UP 2) 122-2 at the second edge location 130-2, the third user plane (UP 3) 122-3 at the third edge location 130-3, . . . the $N_{th}$ user plane at the $N_{th}$ edge location 130-N, etc. By way of example, FIG. 1 illustrates hexagonal grid patterns (i.e., the grids) for the plurality of edge locations 130, where the hexagons in the grids represent the plurality of edge locations 130 (e.g., cells) in the 5G network 100. The plurality of edge locations 130 are served by a plurality of eNodeBs (also referred to as eNBs or base stations) 120 and are associated with a plurality of edge caches (also referred to as caches) 124.

For example, eNodeB$_1$ 120-1 serves the first edge location 130-1, eNodeB$_2$ 120-2 serves the second edge location 130-2, eNodeB$_3$ serves the third edge location 130-2, . . . eNodeB$_N$ 120-N serves the $N_{th}$ edge location 130-N, etc. Further, the first edge location 130-1 is associated with the first cache 124-1, the second edge location 130-2 is associated with the second cache 124-2, the third edge location 130-3 is associated with the third cache 124-3, . . . the $N_{th}$ edge location is associated with the $N_{th}$ cache 124-N, etc. As used herein, an edge location refers to a geographic location and/or a geographic region (e.g., a cell) proximate to a respective eNodeB, over which the respective eNodeB has signal coverage.

In some implementations, the mobile core 110 includes a controller 112, an edge cache selector 114 for selecting an edge cache 124, and a DNS server 116 for handling DNS query. When a client device 105 (e.g., a smartphone, a wearable device, a tablet, etc.) (also known as a client, a user equipment, or a UE) is proximate to an edge location 130 (e.g., the first edge location 130-1), a respective UP associated with the respective eNodeB 120 serving the edge location 130 (e.g. the UP 1 122-1 serving the first edge location 130-1) assigns an IP address to the client device 105. As will be described below with reference to FIGS. 2A and 2B, when the client device 105 requests a media content item from the content server, the client device 105 sends a DNS query to the DNS server 114 in order to resolve the content server reachability, thereby involving the edge cache selector 112 to select a fully qualified domain name (FQDN) of the closest edge cache (the first edge cache 124-1) based at least in part on the IP address of the client device 105. The selected edge cache (e.g., the first edge cache 124-1) then provides the requested media content item to the client device 105.

Though not shown in FIG. 1, in some implementations, the client device 105 includes a local playout buffer and maintains state information (e.g., state information including which portions of the media content item to be downloaded and/or played next). When the client device 105 moves away from the first edge location 130-1 and moves proximate to an adjacent edge location 130 (e.g., the second edge location 130-2 as indicated by the dotted arrow in FIG. 1) it continues to play the media content item from its local playout buffer for content continuity. As used herein, adjacency is defined by the potential to handover. That is, two edge locations are adjacent if a client device 105 can be handed over from one to the other. In FIG. 1, for instance, the second edge location 130-2 and the third edge location 130-3 are examples of adjacent edge locations to the first edge location 130-1.

As the client device 105 moves proximate to the second edge location 130-2, as will be described below with reference to FIGS. 2A and 2B, a handover occurs from eNodeB$_1$ 120-1 to eNodeB$_2$ 120-1, so that UP 2 122-2 associated with eNodeB$_2$ 120-2 serving the second edge location 130-2 causes the assignment of a new IP address to the client device 105. Further, the client device 105 sends another DNS query to the DNS server 114, and the edge cache selector 112 of the mobile core 110 selects a fully qualified domain name of the closest edge cache (the second edge cache 124-2) based at least in part on the new IP address of the client device 105. The newly selected edge cache (e.g., the second edge cache 124-2) then continues to provide the requested media content item to the client device 105 for service continuity.

Figure 2A:
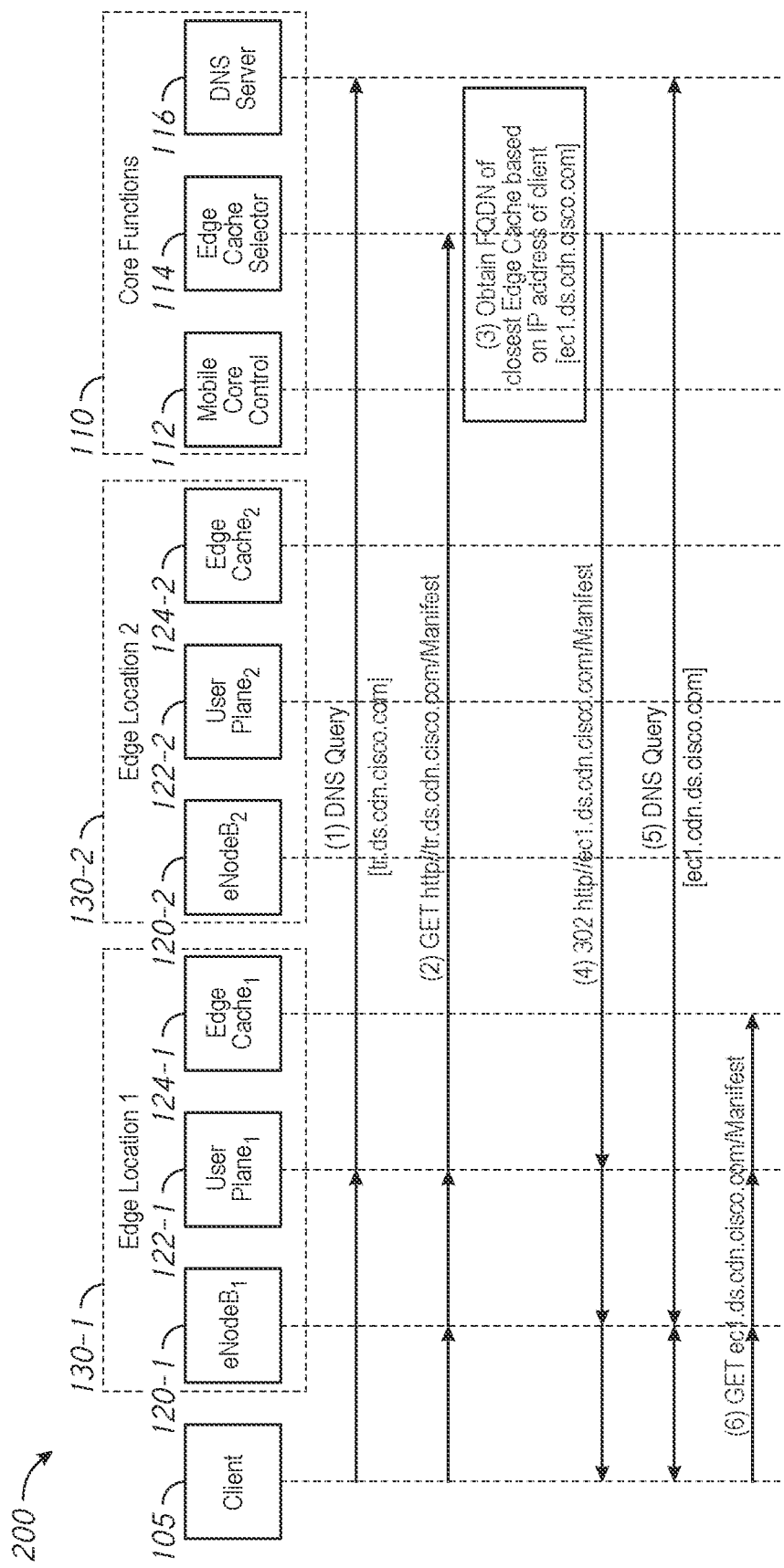
FIGS. 2A-2B are illustrations of a process flow of content delivery over a mobile network with MEC CUPS in accordance with some implementations.
Figure 2B:
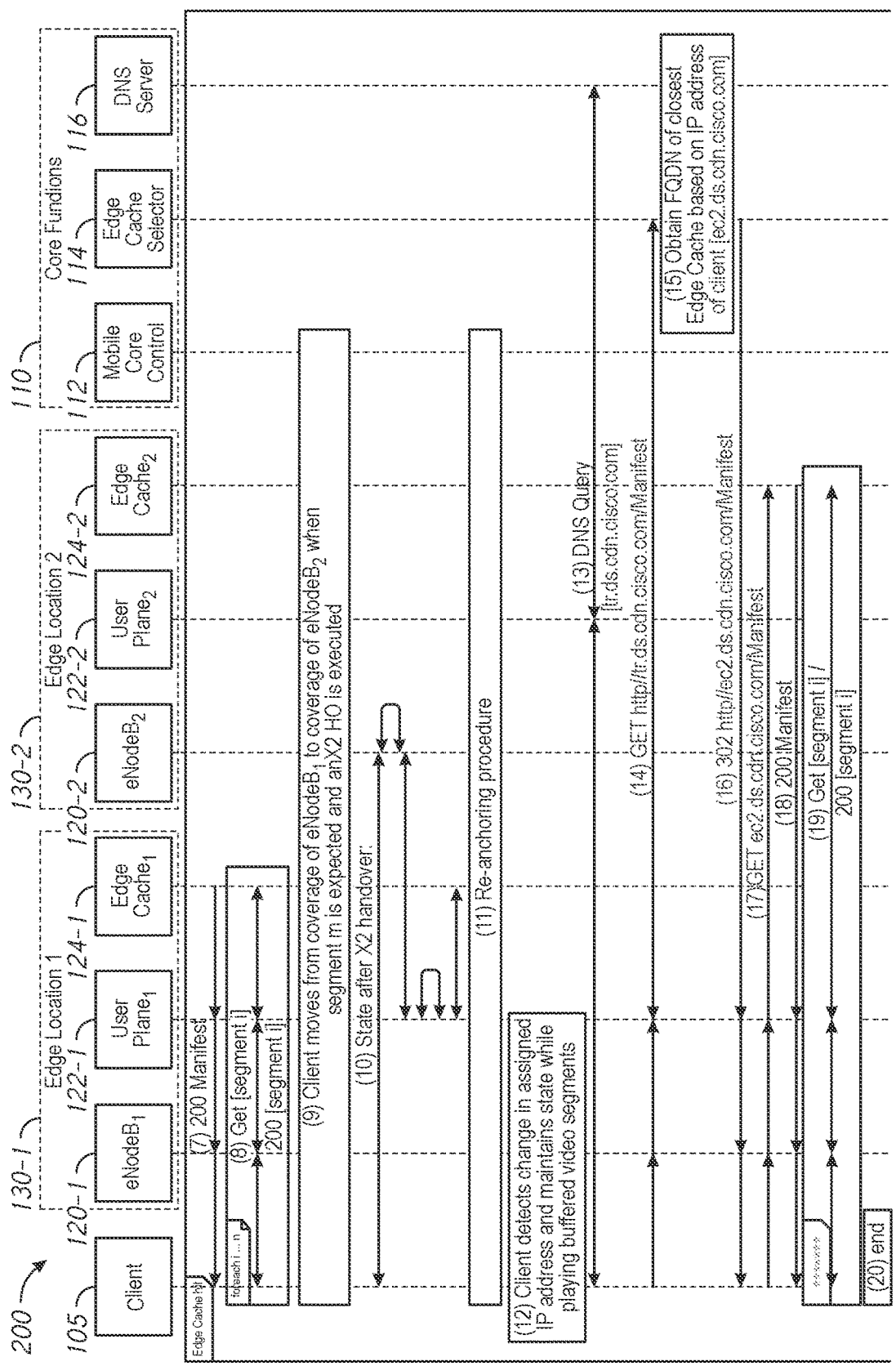

FIGS. 2A-2B illustrate a process flow 200 of content delivery over a mobile network with MEC CUP in accordance with some implementations. In some implementations, the process flow 200 is applied to a 5G mobile network with MEC CUPS (e.g., the 5G mobile network 100 in FIG. 1). While certain specific features are illustrated, those skilled in the art will appreciate from the present disclosure that various other features have not been illustrated for the sake of brevity, and so as not to obscure more pertinent aspects of the embodiments disclosed herein.

To that end, as a non-limiting example, the process flow 200 begins with the client device 105 sending a DNS query for edge cache selection to the DNS server 116 of the mobile core 110 (step 1 of FIG. 2A). Though FIG. 2A illustrates sending the DNS query for edge cache selection to the DNS server 116, in some implementations, a DNS request can be responded to by a cached DNS entry. For example, instead of sending the DNS query to the DNS server 116, the DNS query can be sent or forwarded to a DNS cache in the network 100 or stay at the client 105. As a result, the DNS cache in the network 100 or a cache on the client 105 can provide response to the DNS request.

In some implementations, the DNS query request is sent via the first user plane (UP1) 122-1 at the first edge location 130-1 to the DNS server 116. The process flow 200 continues with the client device 105 requesting the media content from the closest edge cache via HTTP GET (step 2 of FIG. 2A). In some implementations, the request is sent via the first user plane 122-1 and/or the eNodeB$_1$ 120-1 serving the first edge location 130-1 to the edge cache selector 114. In response, the edge cache selector 114 obtains FQDN of the closest edge cache (e.g., the first edge cache 124-1) based at least in part on the IP address of the client device 105 (step 3 of FIG. 2A). As such, the selected edge cache is geographically appropriate (e.g., the selected edge is geographically closest to the client device 105). The edge cache selector 114 then returns the FQDN of the first edge cache 124-1 to the client device 105 in an HTTP 302 redirect response (step 4 of FIG. 2A) in accordance with some implementations. In some implementations, the client device 105 receives the FQDN of the first edge cache 124-1 via the first user plane 122-1 and/or the eNodeB$_1$ 120-1 serving the first edge location 130-1.

Upon receiving the HTTP 302 redirect response, the client device 105 sends a DNS query for the selected edge cache 124-1 (step 5 of FIG. 2A). In some implementations, the DNS query is sent via the eNodeB$_1$ 120-1 serving the first edge location 130-1. The client device 105 then requests the media content item (step 6 of FIG. 2A) from the first edge cache 124-1 and receives an indication of edge cache hit (step 7 of FIG. 2B). It should be noted that similar to step 1 of FIG. 2A described above, though step 5 of FIG. 2A illustrates sending the DNS query to the DNS server 116, in some implementations, a DNS request can be responded to by a cached DNS entry in the network 100 or a cache on the client 105.

In some implementations, the content delivery uses an HTTP adaptive streaming (HAS) technique. It should be noted that the content delivery is not limited to HAS technique. For example, multicast adaptive bitrate streaming (ABR) can deliver content in place of HAS technique. HAS divides the media content item, e.g., dividing the media content item to n segments. As is known in the art, in order to stream video, the client device 105 typically sends a request (e.g., HTTP version 1.1 or HTTP version 2) to the first edge cache 124-1, which includes a universal resource locator (URL) associated with the media content item. In case the edge cache 124-1 allows the client device 105 to access the URL, packets carrying a first portion of the media content item located at the URL are provided to the client device 105. After a certain amount of time, the client device 105 sends another request for more packets carrying a second portion of the media content item located at a next URL, and so forth. For instance, as shown in FIG. 2B, the client device 105 executes a loop to obtain segments or chunks 1 to n from the first edge cache 124-1 (step 8 of FIG. 2B).

In some implementations, as explained above in connection with FIG. 1, the client device 105 includes a local playout buffer and maintains state information, including the state information of the media content item (e.g., tracking which segment to be downloaded and/or played next). When the client device 105 moves away from the first edge location 130-1 to be closer to the second edge location 130-2 (step 9 of FIG. 2B), the state information indicates that the client device 105 expects segment m from the first edge cache 124-1. Further, in step 9 of FIG. 2B, a handover (e.g., an X2-based handover) is executed. Messages including cell identifiers are exchanged to instruct the client device 105 to disconnect from the first edge location 130-1 and/or eNodeB$_1$ 120-1 and re-attach to the second edge location 130-2 and/or eNodeB$_2$ 120-2. Accordingly, after the handover, the eNodeB$_2$ 120-2 serves the client device 105 and assigns the client device 105 a new IP address. Further, the client device 105 sends the state information to the eNodeB2 120-2 at the second edge location 130-2 (step 10 of FIG. 2B). Subsequently, a re-anchoring procedure is executed (step 11 of FIG. 2B).

In some implementations, using techniques applied to mobile networks with MEC CUPS, the re-anchoring procedure selects a user plane function (e.g., the second user plane 122-2) that is geographically appropriate or close to the client device 105 in order to reduce latency and provide suitable QoE. Subsequent to the handover and/or the re-anchoring, the client device 105 detects the IP address change and maintains state, while playing the media content item from its local playout buffer (step 12 of FIG. 2B). Further, the client device 105 attempts to reconnect to the new edge cache 124-2 starting in step 13 of FIG. 2B.

In some implementations, the client device 105 rediscovers the edge cache by sending a DNS query to the DNS server 116 of the mobile core 110 (step 13 of FIG. 2B). In some implementations, the DNS query request is sent via the second user plane 122-2 at the second edge location 130-2. It should be noted that similar to step 1 of FIG. 2A described above, though step 13 of FIG. 2B illustrates sending the DNS query to the DNS server 116, in some implementations, a DNS request can be responded to by a cached DNS entry in the network 100 or a cache on the client 105. The process flow 200 continues with the client device 105 requesting the closest edge cache (e.g., the second edge cache 124-2) (step 14 of FIG. 2B). In some implementations, the request for the closest edge cache is sent via the second user plane 122-2 and/or the eNodeB2 120-2 associated with the second edge location 130-2 to the edge cache selector 114. In response, the edge cache selector 114 obtains the FQDN of the second edge cache 124-2 based at least in part on the new IP address of the client device 105 (step 15 of FIG. 2B). The edge cache selector 114 then returns the FQDN of the second edge cache 124-2 to the client device 105 in an HTTP 302 redirect response (step 16 of FIG. 2A). In some implementations, the client device 105 receives the FQDN of the second edge cache 124-2 via the second user plane 122-2 and/or the eNodeB2 120-2 associated with the second edge location 130-2. The client device 105 then requests the media content item from the second edge cache (step 17 of FIG. 2B) and receives an indication of edge cache hit (step 18 of FIG. 2B).

In some implementations, according to the state information from the client device 105, portions of the media content item subsequent to the portions previously provided to the client device 105 are retrieved from the second edge caches and provided to the client device 105. For instance, as shown in FIG. 2B, according to the state information, the client device 105 is expecting segment m when the handover occurred in step 9. The process 200 continues with a loop for the client to receive each segment i in segments m to n of the media content item from the second edge cache 124-2 (step 19 of FIG. 2B) before ending in step 20 of FIG. 2B.

Figure 3:
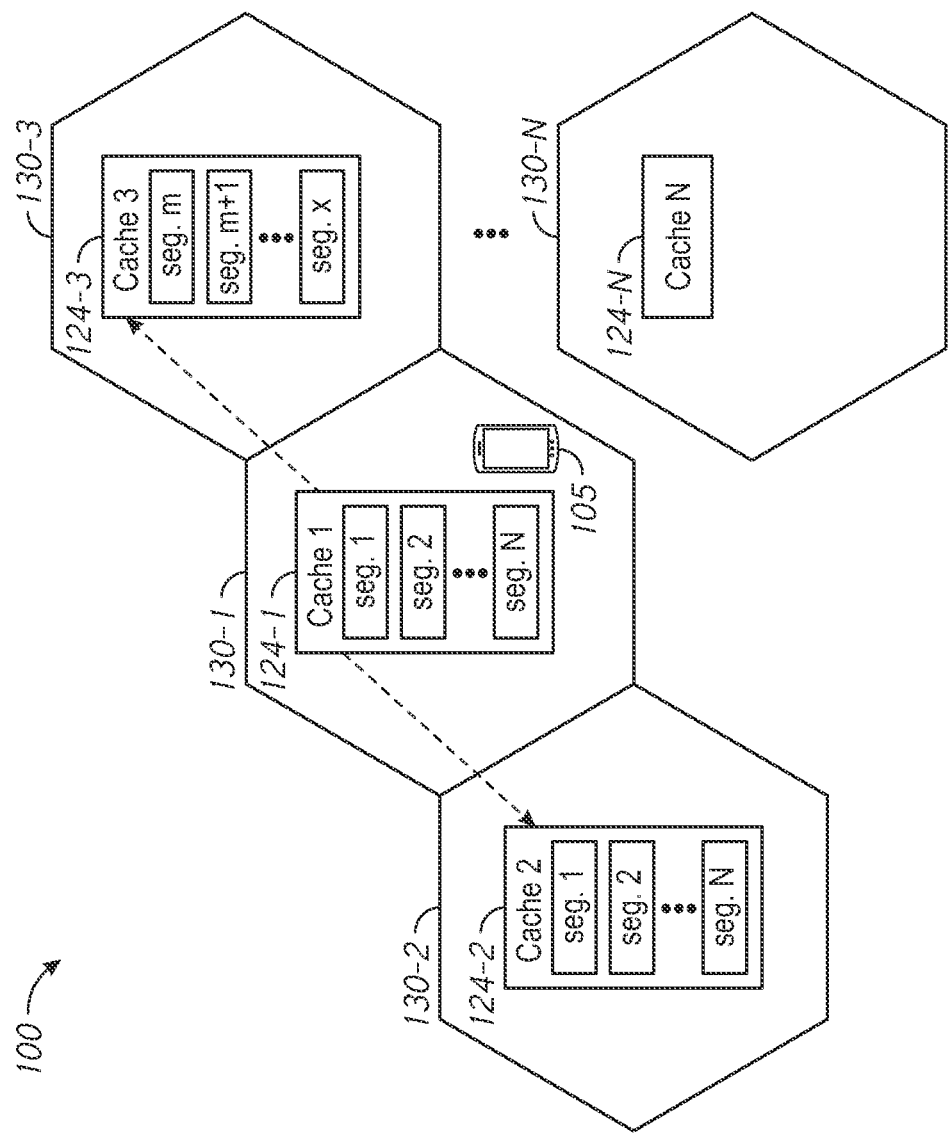
FIG. 3 is an illustration of an example of edge caching for content delivery in a 5G network with MEC CUPS in accordance with some implementations.

FIG. 3 is an illustration of an example of edge caching for content delivery in a 5G network 300 with MEC CUPS in accordance with some implementations. The network 300 illustrated in FIG. 3 is similar to and adapted from the network 100 illustrated in FIG. 1. Accordingly, elements common to FIGS. 1 and 3 include common reference numbers, and the differences between FIGS. 1 and 3 are described herein for the sake of brevity.

In some implementations, in order to maintain service continuity, in response to receiving a content request, an edge cache communicates with other edge caches associated with adjacent edge locations. For instance, as indicated by the dotted arrows in FIG. 3, when the first edge cache 124-1 associated with the first edge location 130-1 receives a content request from the client device 105, it communicates with at least the second edge cache 124-2 and the third edge cache 124-3 associated with the adjacent edge locations 130-2 and 130-3. In some implementations, the communications cause the edge caches 124-2 and 124-3 at the adjacent locations 130-2 and 130-3 to also download the requested media content item. For instance, using HAS, a requested media content item is divided into N segments. When the first edge cache 124-2 receives the content request for the media content item, the second edge cache 124-2 associated with the adjacent edge location 130-2 also downloads segments 1 to N of the media content item. Since the requested media content item would be available for the client device 105 when the handover occurs, e.g., when the client device 105 indicates it is expecting segment m of the media content item, service continuity remains the same when the client device 105 moves to an adjacent edge location, e.g., the edge location 130-2.

In some implementations, the edge caches 124 associated with the adjacent edge locations 130 pre-cache a portion of the media content item, e.g., a few minutes or a predetermined duration of the media content item subsequent the portion provided from the first edge cache 124-1. After a handover occurs, the remaining portions of the media content item may be downloaded. For instance, assuming the first edge cache 124-1 is expected to provide segments 1 to m−1 of the requested media content item to the client device 105. Based on the communications with the first edge cache 124-1, the edge cache 124-2 obtains segments m to x of the requested media content item corresponding to a few minutes or a configurable duration of the media, as shown in FIG. 3. Though not shown in FIG. 3, assuming the client device 105 moves proximate to the third edge location 130-3, after the handover occurs, segments x+1 to N are downloaded to the third edge cache 124-3 associated with the third edge location 130-3 in accordance with some implementations.

In some implementations, a respective edge cache 124 is selected by mapping the IP address of the client device 105 into an IP address range and associating the IP address range with the respective edge location. In some implementations, in addition to considering the IP address range, the edge cache selection process also takes into consideration the availability of the requested media content item. In some implementations, the mobile control plane and the content control plane coordinate so as to exchange relevant information about the media content item requested by the client device 105. In other words, the handover criteria are not limited to IP address range and/or radio characteristics. It can also take into consideration the local and/or remote content availability. In some implementations, eNodeBs at various edge locations 130 exchange the information about content availability at the edge caches 124 associated with the edge locations 130. In case a last-in-first-out (LIFO) discipline is deployed for cache content management at the edge locations 130, chances are that the requested media content item is already deployed in the edge caches 124 associated with different adjacent edge locations 130, thus improving efficiency.

Figure 4:
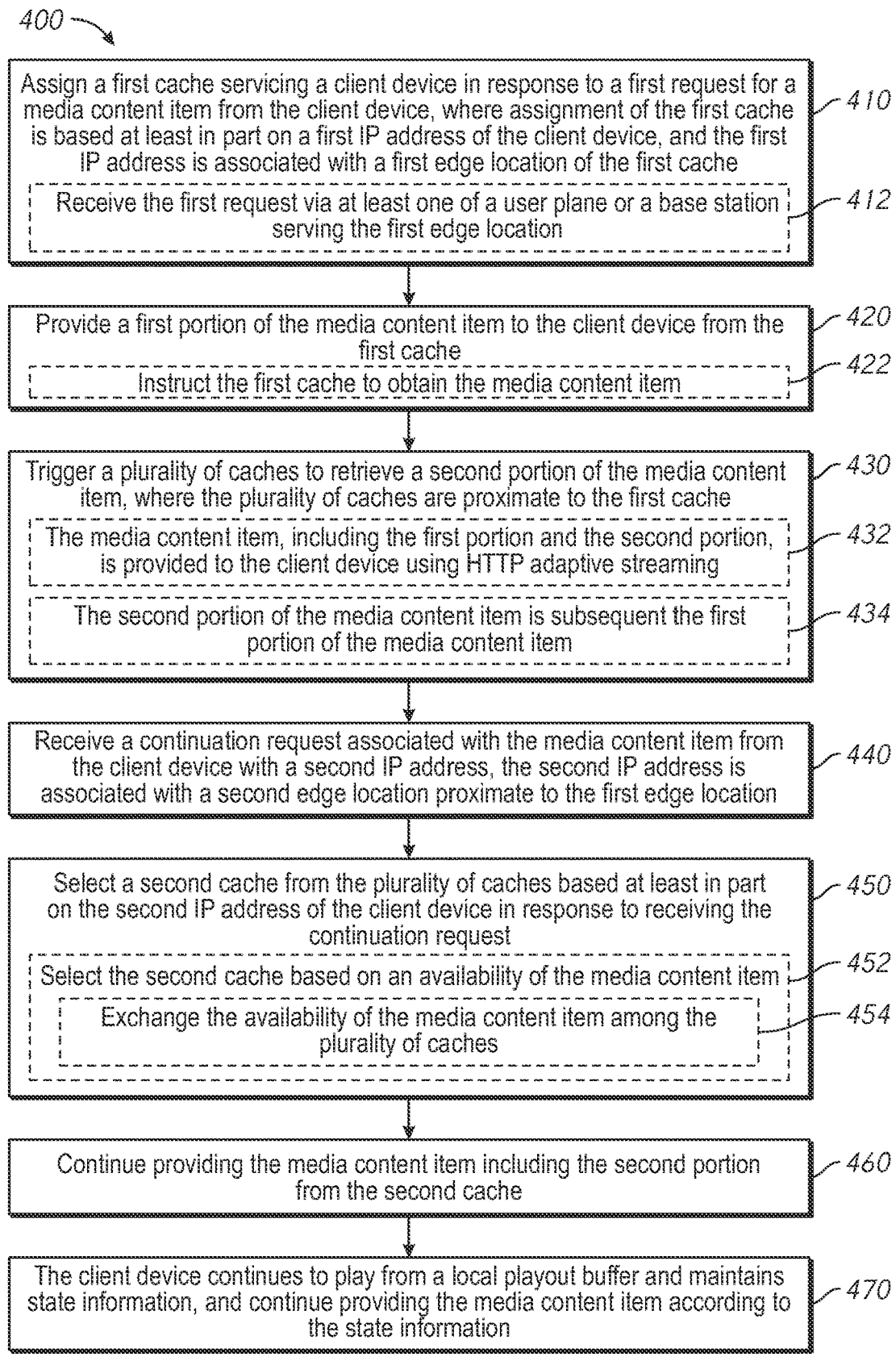
FIG. 4 is a flowchart illustrating a method of content delivery in a mobile network with MEC CUPS in accordance with some implementations.

FIG. 4 is a flowchart illustrating a method 400 of content delivery in a mobile network with MEC CUPS in accordance with some implementations. In some implementations, the method 400 is performed at a mobile core (e.g., the mobile core 110 in FIGS. 1 and 2A-2B) with a controller (e.g., the mobile core controller 112 in FIGS. 1 and 2A-2B) and a non-transitory memory. In some implementations, in addition to the controller, the mobile core includes an edge cache selector (e.g., the edge cache selector 114 in FIGS. 1 and 2A-2B) and a DNS server (e.g., the DNS server 116 in FIGS. 1 and 2A-2B).

Beginning at block 410 of FIG. 4, the mobile core assigns a first cache servicing a client device in response to a first request for a media content item from the client device. In some implementations, the assignment of the first cache is based at least in part on a first IP address of the client device, and the first IP address is associated with a first edge location of the first cache. Further, in some implementations, as represented by block 412, the method 400 includes receiving the first request via at least one of a user plane or a base station serving the first edge location. For instance, in steps 1 to 4 of FIG. 2A, the mobile core 110 obtains an FQDN of the closest edge cache based on an IP address of the client device 105 in response to a request for a media content item from the client device 105. In some implementations, as shown in FIG. 2A, the request is communicated to the mobile core 110 through a number of messages, including a DNS query via the first user plane 122-1 (step 1 of FIG. 2A) and a request for the closest edge cache via the eNodeB₁ 120-1 and/or the first user plane 122-1 (step 2 of FIG. 2A).

As represented by block 420, the method 400 includes providing a first portion of the media content item to the client device from the first cache. In some implementations, as represented by block 422, providing the first portion of the media content item to the client device from the first cache includes instructing the first cache to obtain the media content item. For example, in FIG. 1, having assigned the first edge cache 124-1 to the client device 105, the mobile core 110 instructs the first edge cache 124-1 to obtain the requested media content item (e.g., from a content provider if the content has not been cached or has expired). Further, as shown in FIG. 2B, segments of the media content item are provided from the first edge cache 124-1 to the client device 105 in step 8 of FIG. 2B.

As represented by block 430, the method 400 further includes triggering a plurality of caches to retrieve a second portion of the media content item, where the plurality of caches are associated with edge locations proximate to the first edge location. For example, in FIG. 3, the first edge cache 124-1 is associated with the first edge location 130-1, the second edge cache 124-2 is associated with the second edge location 130-2, and the third edge cache 124-3 is associated with the third edge location 130-3. The second edge cache 124-2 and the third edge cache 124-3 are associated with edge locations 130-2 and 130-3, respectively, proximate to the first edge location 130-1. In other words, the first edge location 130-1 is adjacent to the second edge location 130-2 and the third edge location 130-2 so that potential handovers can occur. As such, the second cache 124-2 associated with the second edge location 130-2 and the third cache 124-3 associated with the third edge location 130-3 also download at least portions of the media content item.

In some implementations, as represented by block 432, the media content item, including the first portion and the second portion, is provided to the client device using HTTP adaptive streaming (HAS). In such implementations, the first portion of the media content includes a first set of segments of the media content item divided during the HTTP adaptive streaming; and the second portion of the media content includes a second set of segments of the media content item divided during the HTTP adaptive streaming. For example, as shown in FIG. 2B, using HAS, segments 1 to m−1 of the requested media content item are provided to the client device 105 from the first edge cache 124-1 prior to the client 105 moving away from the coverage of eNodeB₁ 120-1 (step 8 of FIG. 2B). After the client 105 moves and a handover is executed, segments m to n of the requested medial content item are provided to the client device 105 from the second edge cache 124-2 (step 19 of FIG. 2B).

In some implementations, as represented by block 434, the second portion of the media content item is subsequent the first portion of the media content item. For instance, in FIG. 3, while the first edge cache 124-1 is providing segments 1 to m−1 of the requested media content item, the edge cache 124-3 at the adjacent edge location 130-3 pre-caches the first few minutes of the media represented by segments m to x of the media content item subsequent segments 1 to m−1 of the media content.

The method 400 continues, as represented by block 440, with the mobile core receiving a continuation request associated with the media content item from the client device with a second IP address, where the second IP address is associated with a second edge location proximate to the first edge location. For instance, in FIG. 2B, after the client 105 moves from the first edge location 130-1 (e.g., the coverage of eNodeB₁ 120-1) to the second edge location 130-2 (e.g. the coverage of eNodeB₂ 120-2) (step 9 of FIG. 2B), the eNodeB₂ 120-2 assigns a new IP address to the client device 105. Subsequently, as shown in FIG. 2B, the client device 105 sends a number of messages indicating the continuation request, e.g., a DNS query (step 13 of FIG. 2B) and a request for the closest edge cache based on the new IP address of the client device 105 assigned by the eNodeB$_2$ 120-2 (step 14 of FIG. 2B).

In response to receiving the continuation request, as represented by block 450, the method 400 includes selecting a second cache from the plurality of caches based at least in part on the second IP address. For example, in FIG. 1, between the edge caches 124-2 and 124-3 at the adjacent edge locations 130-2 and 130-3, the second edge cache 124-2 is selected to continue providing content to the client device 105. The second edge cache 124-2 is selected based at least in part on the new IP address of the client device 105 assigned by the eNodeB$_2$ 120-2 serving the second edge location 130-2. In other words, the second edge cache 124-2 associated with the second edge location 130-2 is the closest to the client device 105 after the client device moves closer to the second edge location 130-2.

In some implementations, the second cache selection is not limited to radio characteristics. As represented by block 452, in some implementations, selecting the second cache from the plurality of the caches includes selecting the second cache based on an availability of the media content item. Further as represented by block 454, in some implementations, the availability of the media content item is exchanged among the plurality of caches. For example, when assigning a new edge cache to continue providing the media content, the mobile core also considers whether the requested media content item is available at an edge cache. In some implementations, the edge caches can communicate with each other to determine the availability of the media content item and to facilitate the selection of a new edge cache.

Still referring to FIG. 4, as represented by block 460, the method 400 includes continuing providing the media content item including the second portion from the second cache. Further, in some implementations, as represented by block 470, the method 400 includes causing the client device to continue to play the media content item from a local playout buffer and maintain state information associated with the media content item. In such implementations, continuing providing the media content item includes continuing providing the media content item in accordance with the state information. For example, as shown in FIG. 2B, a handover has occurred, the client device 105 moves from the coverage of eNodeB$_1$ 120-1 serving the first edge location 130-1 to the coverage of eNodeB$_2$ 120-2 serving the second edge location 130-2. Further, when the handover is executed, segment m of the media content item is expected. The client device 105 continues to play the content from its local playout buffer in some implementations (step 12 of FIG. 2B). After the handover, the second edge cache 124-2 continues to provide the media content item to the client device 105 in accordance with the state information maintained by the client device 105, e.g., starting to provide segment m in step 19 of FIG. 2B.

Figure 5:
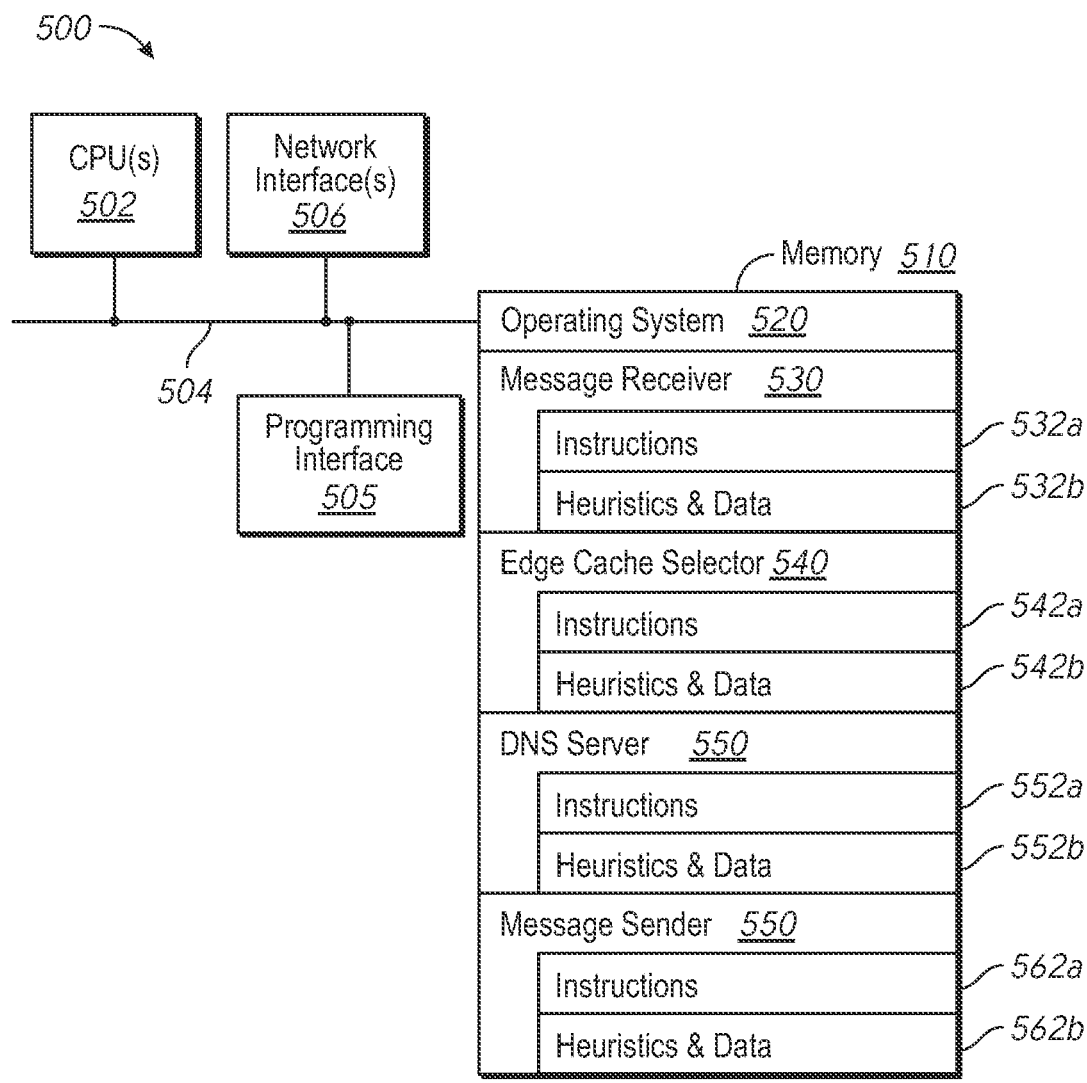
FIG. 5 is a block diagram of a computing device in accordance with some implementations.

FIG. 5 is a block diagram of a computing device 500 in accordance with some implementations. In some implementations, the computing device 500 provides mobile core functions, e.g., the mobile core 110 in FIGS. 1 and 2A-2B providing mobile core controller functions, edge cache selection functions, and DNS server functions described above. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the computing device 500 includes one or more processing units (CPUs) 502 (e.g., processors), one or more network interfaces 506, a memory 510, a programming interface 505, and one or more communication buses 504 for interconnecting these and various other components.

In some implementations, the communication buses 504 include circuitry that interconnects and controls communications between system components. The memory 510 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 510 optionally includes one or more storage devices remotely located from the one or more CPUs 502. The memory 510 comprises a non-transitory computer readable storage medium. Moreover, in some implementations, the memory 510 or the non-transitory computer readable storage medium of the memory 510 stores the following programs, modules and data structures, or a subset thereof including an optional operating system 520, a message receiver 530, an edge cache selector 540 (e.g., the edge cache selector 114 in FIGS. 1 and 2A-2B), a DNS server 550 (e.g., the DNS server 116 in FIGS. 1 and 2A-2B), and a message sender 560. In some implementations, one or more instructions are included in a combination of logic and non-transitory memory. The operating system 520 includes procedures for handling various basic system services and for performing hardware dependent tasks.

In some implementations, the message receiver 530 is configured to receive a message, e.g., a DNS query message, an HTTP GET message, etc., from edge locations. To that end, the message receiver 530 includes a set of instructions 532a and heuristics and data 532b.

In some implementations, the edge cache selector 540 is configured to select an edge cache providing content to the client device. To that end, the edge cache selector 540 includes a set of instructions 542a and heuristics and data 542b.

In some implementations, the DNS server 550 is configured to handle DNS queries. To that end, the DNS server 550 includes a set of instructions 552a and heuristics and data 552b.

In some implementations, the message sender 560 is configured to send messages, e.g., response to HTTP GET messages. To that end, the message sender 560 includes a set of instructions 562a and heuristics and data 562b.

Although the message receiver 530, the edge cache selector 540, the DNS server 550, and the message sender 560 are illustrated as residing on a single computing device 500, it should be understood that in other embodiments, any combination of the message receiver 530, the edge cache selector 540, the DNS server 550, and the message sender 560 are illustrated as residing on the single computing device 500 can reside in separate computing devices in various implementations. For example, in some implementations, each of the message receiver 530, the edge cache selector 540, the DNS server 550, and the message sender 560 are illustrated as residing on a single computing device 500 resides on a separate computing device.

Moreover, FIG. 5 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Note that the components and techniques shown and described in relation to the separate figures can indeed be provided as separate components and techniques, and alternatively one or more (or all of) the components and techniques shown and described in relation to the separate figures are provided together for operation in a cooperative manner.

While various aspects of embodiments within the scope of the appended claims are described above, it should be apparent that the various features of embodiments described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first", "second", etc. can be used herein to describe various elements, these elements should not be limited by these terms. These terms are only used to distinguish one element from another. For example, a first spine switch could be termed a second spine switch, and, similarly, a second spine switch could be termed a first spine switch, which changing the meaning of the description, so long as all occurrences of the "first spine switch" are renamed consistently and all occurrences of the second spine switch are renamed consistently. The first spine switch and the second spine switch are both spine switches, but they are not the same spine switch.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

What is claimed is:

1. A method, comprising:
   at a mobile core including a controller and a non-transitory memory:
   assigning a first cache device servicing a client device in response to a first request from the client device, wherein the first request corresponds to content to be consumed by an application hosted on the client device, wherein assignment of the first cache device is based at least in part on a first IP address of the client device, and the first IP address is associated with a first edge location of the first cache device in a mobile core;
   providing a first portion of the content to the client device from the first cache device;
   triggering one or more additional cache devices to retrieve at least a second portion of the content associated with the application, wherein the one or more additional cache devices are associated with edge locations adjacent to the first edge location;
   receiving a continuation request associated with the content from the client device with a second IP address, wherein the second IP address is associated with a second edge location adjacent to the first edge location;
   selecting a second cache device of the one or more additional cache devices based at least in part on the second IP address in response to receiving the continuation request; and
   continuing providing the content associated with the application including the second portion from the second cache device.

2. The method of claim 1, wherein the triggering one or more additional cache devices to retrieve at least a second portion of the content comprises transmitting one or more messages between the first cache device and the one or more additional cache devices.

3. The method of claim 1, wherein the second portion of the content is identified based on state information associated with the application.

4. The method of claim 1, wherein the second portion of the content is identified based on state information maintained by the application hosted on the client device and provided to the second cache device.

5. The method of claim 1, further comprising receiving the first request via at least one of a user plane or a base station serving the first edge location.

6. The method of claim 1, wherein providing the first portion of the content to the client device from the first cache device includes instructing the first cache device to obtain the content.

7. The method of claim 1, wherein selecting the second cache device from the one or more additional cache devices includes selecting the second cache device based on an availability of the content associated with the application.

8. The method of claim 7, wherein the availability of the content is exchanged among the one or more additional cache devices.

9. The method of claim 1, wherein:
   assigning the first cache device servicing the client device is performed in accordance with a determination that an address of the first cache device and the first IP address of the client device indicate the first cache device is the closest to the client device at a first time; and the second cache device is selected in accordance with a determination that an address of the second cache device and the second IP address of the client device indicate the second cache device is the closest to the client device at a second time.

10. A system comprising:

a mobile core including a controller and a non-transitory memory;

a plurality of cache devices including a first cache device and a second cache device;

wherein the controller is operative to:

assign the first cache device servicing a client device in response to a first request from the client device, wherein the first request corresponds to content to be consumed by an application hosted on the client device, wherein assignment of the first cache device is based at least in part on a first IP address of the client device, and the first IP address is associated with a first edge location of the first cache device in a mobile core;

wherein the first cache device is operative to provide a first portion of the content to the client device from the first cache device; and wherein the controller is further operative to trigger one or more additional cache devices to retrieve at least a second portion of the content associated with the application, wherein the one or more additional cache devices are associated with edge locations adjacent to the first edge location;

receive a continuation request associated with the content from the client device with a second IP address, wherein the second IP address is associated with a second edge location adjacent to the first edge location; and select a second cache device of the one or more additional cache devices based at least in part on the second IP address in response to receiving the continuation request; and wherein the second cache device is operative to continue providing the content associated with the application including the second portion from the second cache device.

11. The system according to claim 10, wherein the second portion of the content is identified based on state information associated with the application.

12. The system according to claim 10, wherein the second portion of the content is identified based on state information maintained by the application hosted on the client device and provided to the second cache device.

13. The system according to claim 10, wherein the first request is received via at least one of a user plane or a base station serving the first edge location.

14. The system according to claim 10, wherein providing the first portion of the content to the client device from the first cache device includes instructing the first cache device to obtain the content.

15. The system according to claim 10, wherein to select the second cache device from the plurality of the cache devices, the controller is operative to select the second cache device based on an availability of the content associated with the application.

16. The system according to claim 15, wherein the availability of the content is exchanged among the plurality of cache devices.

17. The system according to claim 10, wherein the controller is further operative to:

assign the first cache device servicing the client device in accordance with a determination that an address of the first cache device and the first IP address of the client device indicate the first cache device is the closest to the client device at a first time; and select the second cache device in accordance with a determination that an address of the second cache device and the second IP address of the client device indicate the second cache device is the closest to the client device at a second time.

* * * * *